United States Patent
Kim et al.

(10) Patent No.: US 7,500,181 B2
(45) Date of Patent: Mar. 3, 2009

(54) METHOD FOR UPDATING A PORTAL PAGE

(75) Inventors: Steven Paul Kim, Raleigh, NC (US); Paul Franklin McMahan, Apex, NC (US); Francisco Inacio de Toledo Moraes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 10/930,394

(22) Filed: Aug. 31, 2004

(65) Prior Publication Data

US 2006/0047728 A1  Mar. 2, 2006

(51) Int. Cl.
*G06F 17/30* (2006.01)
*G06F 17/40* (2006.01)

(52) U.S. Cl. .............. 715/234; 715/203; 715/204; 715/205; 707/10

(58) Field of Classification Search .......... 707/205, 707/10; 715/513, 205, 203, 204, 234; 709/218, 709/219
See application file for complete search history.

(56) References Cited

U.S. PATENT DOCUMENTS

| | | | |
|---|---|---|---|
| 6,606,525 B1 | 8/2003 | Muthuswamy et al. | 700/52 |
| 6,728,769 B1 | 4/2004 | Hoffmann | 709/225 |
| 6,738,804 B1* | 5/2004 | Lo | 709/219 |
| 6,795,830 B1* | 9/2004 | Banerjee et al. | 707/200 |
| 6,918,090 B2* | 7/2005 | Hesmer et al. | 715/760 |
| 7,146,563 B2* | 12/2006 | Hesmer et al. | 715/223 |
| 2002/0133605 A1 | 9/2002 | Khanna et al. | 709/229 |
| 2002/0165988 A1 | 11/2002 | Khan et al. | 709/246 |
| 2003/0001888 A1 | 1/2003 | Power | 345/744 |
| 2003/0004272 A1 | 1/2003 | Power | 525/192 |
| 2003/0149722 A1* | 8/2003 | Jolley et al. | 709/203 |
| 2003/0154200 A1 | 8/2003 | Von Savigny | 707/10 |
| 2003/0158975 A1 | 8/2003 | Frank et al. | 709/331 |
| 2003/0167315 A1 | 9/2003 | Chowdhry et al. | 709/218 |
| 2003/0177175 A1 | 9/2003 | Worley et al. | 709/203 |
| 2003/0187956 A1* | 10/2003 | Belt et al. | 709/219 |
| 2003/0188163 A1* | 10/2003 | Fischer et al. | 713/170 |
| 2003/0216983 A1* | 11/2003 | Bodin | 705/35 |
| 2004/0054749 A1 | 3/2004 | Doyle et al. | 709/217 |
| 2004/0205555 A1* | 10/2004 | Hind et al. | 715/513 |

FOREIGN PATENT DOCUMENTS

WO  WO 2004/031985 A2  4/2004

OTHER PUBLICATIONS

Credle et al, IBM Websphere Portal V4.1, Handbook vol. 2, published: Feb. 4, 2003, IBM, vol. 2, Section 4.2, pp. 1-6.*
Fred et al., "The case for portlets", IBM Developerworks, Online! Feb. 1, 2003, pp. 1-7. http://www-128.ibm.com/developerworks/ibm/library/l-portletintro/>, retrieved Nov. 18, 2005.

* cited by examiner

*Primary Examiner*—Stephen S Hong
*Assistant Examiner*—Wilson Tsui
(74) *Attorney, Agent, or Firm*—Duke W. Yee; Robert Straight; A. M. Thompson

(57) ABSTRACT

A method for updating a document. A selected user input to a portlet window in a set of portlet windows is detected. The portlet window contains a current content. In response to detecting the selected user input, new content for the portlet window is requested from a server. The new content for the portlet window from the server is received. In response to receiving the new content for the portlet window, the new content replaces the current content without interrupting other portlet windows in the set.

7 Claims, 5 Drawing Sheets

300

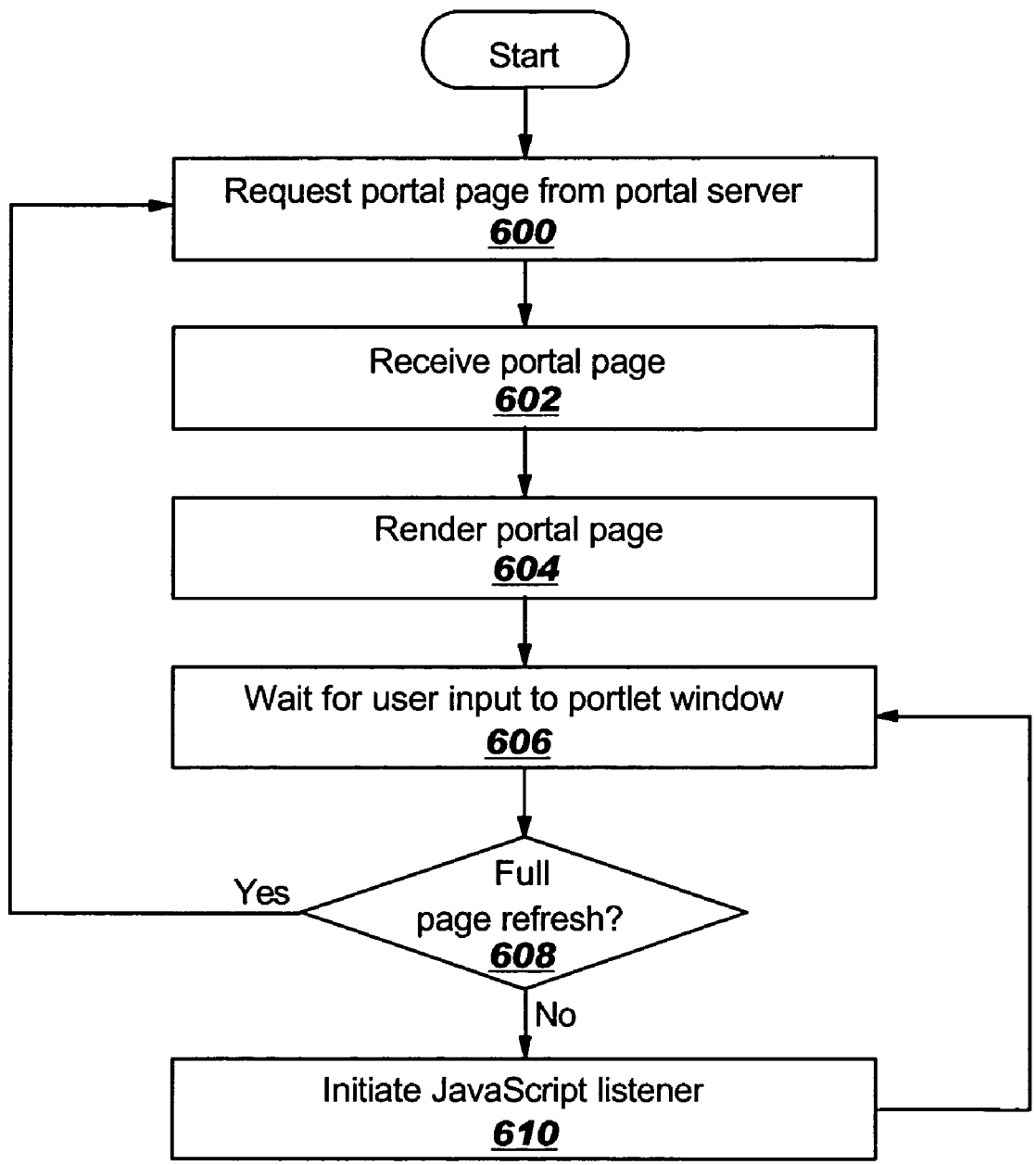

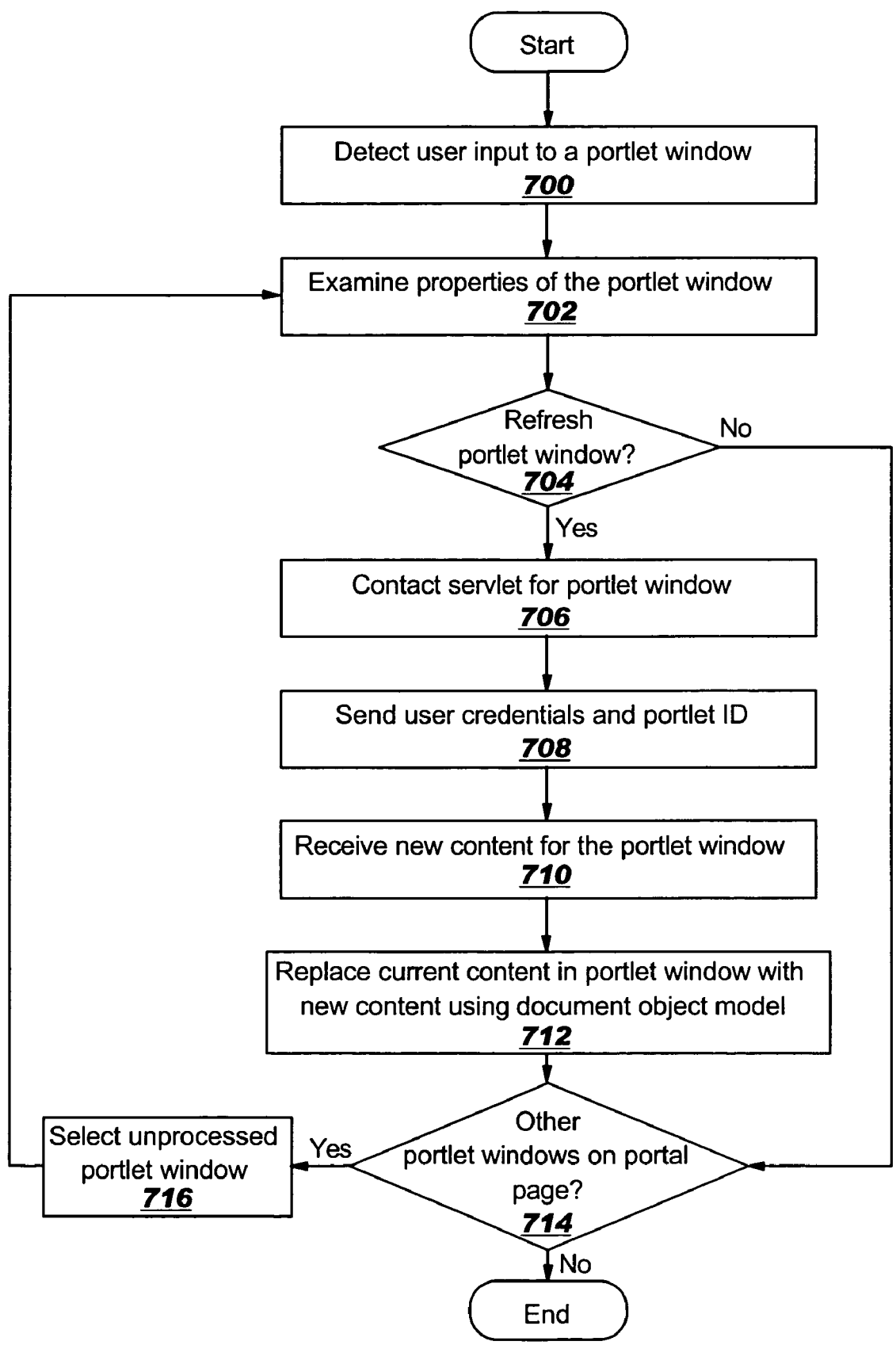

METHOD FOR UPDATING A PORTAL PAGE

BACKGROUND OF THE INVENTION

1. Technical Field

The present invention relates to an improved data processing system and in particular to a method and apparatus for processing data. Still more particularly, the present invention relates to a method, apparatus, and computer instructions for updating a document, such as a portal page.

2. Description of Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized both communications and commerce, as well as, being a source of both information and entertainment. For many users, email is a widely used format to communicate over the Internet. Additionally, the Internet is also used for real-time voice conversations.

With respect to transferring data over the Internet, the World Wide Web environment is used. This environment is also referred to simply as "the Web". The Web is a mechanism used to access information over the Internet. In the Web environment, servers and clients effect data transaction using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages. Resources, such as Web pages, are retrieved by a browser, which is capable of submitting a request for the resource. This request typically includes an identifier, such as, for example, a URL. As used herein, a browser is an application used to navigate or view information or data in any distributed database, such as the Internet or the World Wide Web. A user may enter a domain name through a graphical user interface (GUI) for the browser to access a source of content. The domain name is automatically converted to the IP address by a domain name system (DNS), which is a service that translates the symbolic name entered by the user into an IP address by looking up the domain name in a database.

The browser includes a user interface, which is a GUI that allows the user to interface or communicate with another browser. This interface provides for a selection of various functions through menus and allows for navigation. For example, a menu may allow a user to perform various functions, such as saving a file, opening a new window, displaying a history, and entering a URL.

With respect to obtaining information on the Internet, portal based user interfaces are becoming increasingly popular because these types of interfaces allow the user to see user interfaces, also referred to as portlet windows, which gather data from many different sources going into a single hypertext mark-up language (HTML) page. One problem that arises with joining these different portlet windows into a single HTML page is that the driving action from one portlet window causes all of the portlet windows to be reloaded in the browser. This type of refreshing of the entire portal page has a number of bad side affects. For example, data entered into the other portlet window by the user may be lost. Additionally, the browser scroll position is reset. This situation causes the portal page to jump from a portlet window of interest to another view. Also, having to reload content for each portlet window causes increase overload because each portlet on the server generating data for a portlet window has to regenerate the code for the page. Also, increased network traffic occurs because HTML code for all of the portlet windows is reset, regardless of whether the content has changed.

Two commonly used techniques to avoid this problem are to use frames or applets. The down side of using frames is that the width and height of the frame must be specified in absolute dimensions. This situation causes the portlet to not resize when the browser resizes. Such a situation is unacceptable in many circumstances. Applets have a down side in that an action from another portlet window will force the applet to reinitialize its state. Initially, applets have a greater footprint in the browser and may raise security concerns with some users.

Therefore, it would be advantageous to have an improved method, apparatus, and computer instructions for refreshing content in a portlet window.

BRIEF SUMMARY OF THE INVENTION

The present invention provides a method, apparatus and computer instructions for updating a document. A selected user input to a portlet window in a set of portlet windows is detected, wherein current content is displayed in the portlet window. In response to detecting the selected user input, new content for the portlet window is requested from a server. The new content for the portlet window from the server is received. In response to receiving the new content for the portlet window, the current content with the new content without interrupting other portlet windows in the set is replaced.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart of a process for rendering a portal page in accordance with a preferred embodiment of the present invention; and FIG. 7 is a diagram illustrating a process for processing user input to a portlet window in accordance with a preferred embodiment of the present invention.

DETAILED DESCRIPTION OF THE INVENTION

Figure 1:
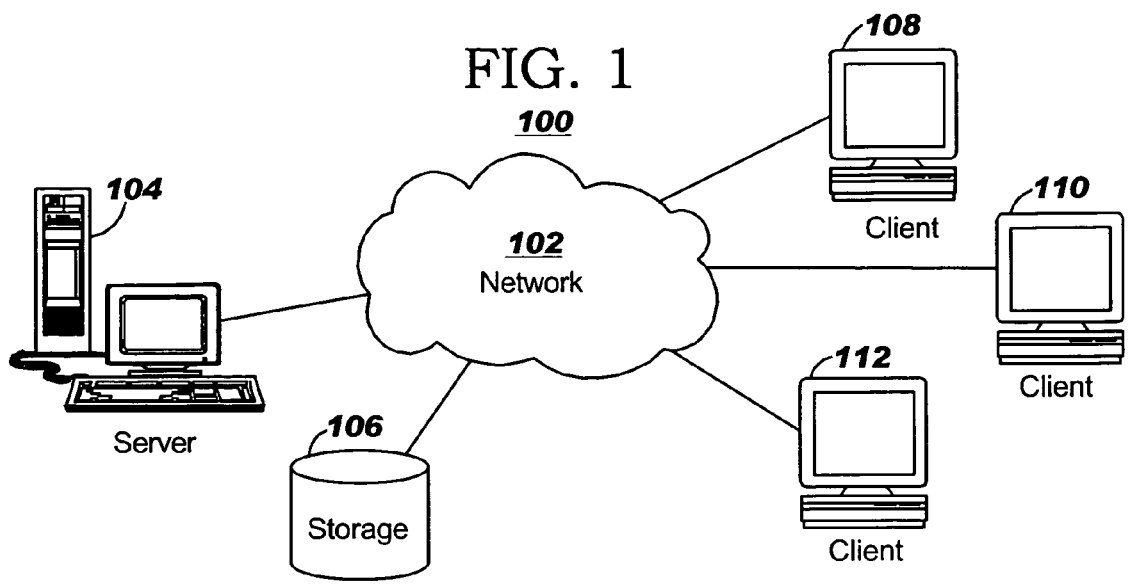
FIG. 1 is a pictorial representation of a network data processing system in which the present invention may be implemented in accordance with a preferred embodiment of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite to protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the present invention.

Figure 2:
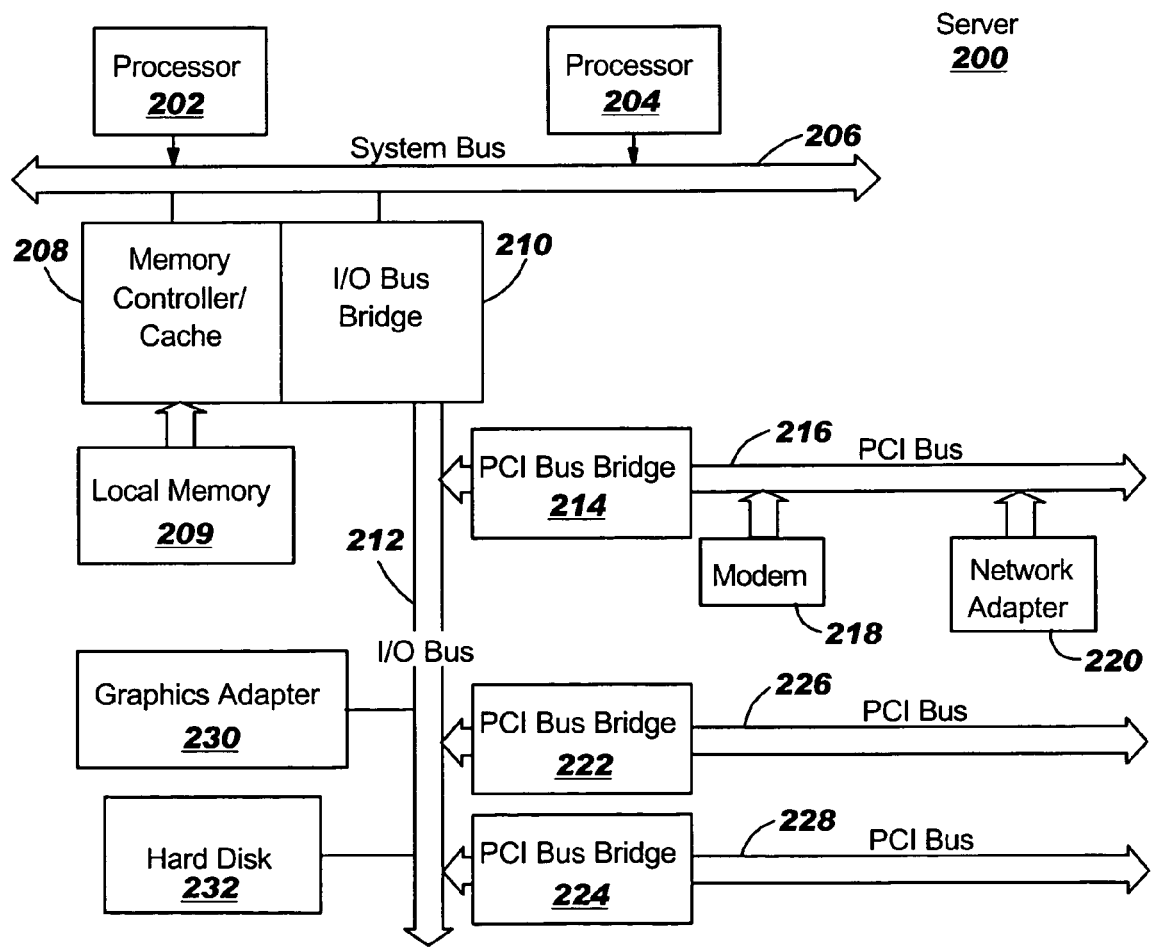
FIG. 2 is a block diagram of a data processing system in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local 216. Typical PCI bus implementation will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
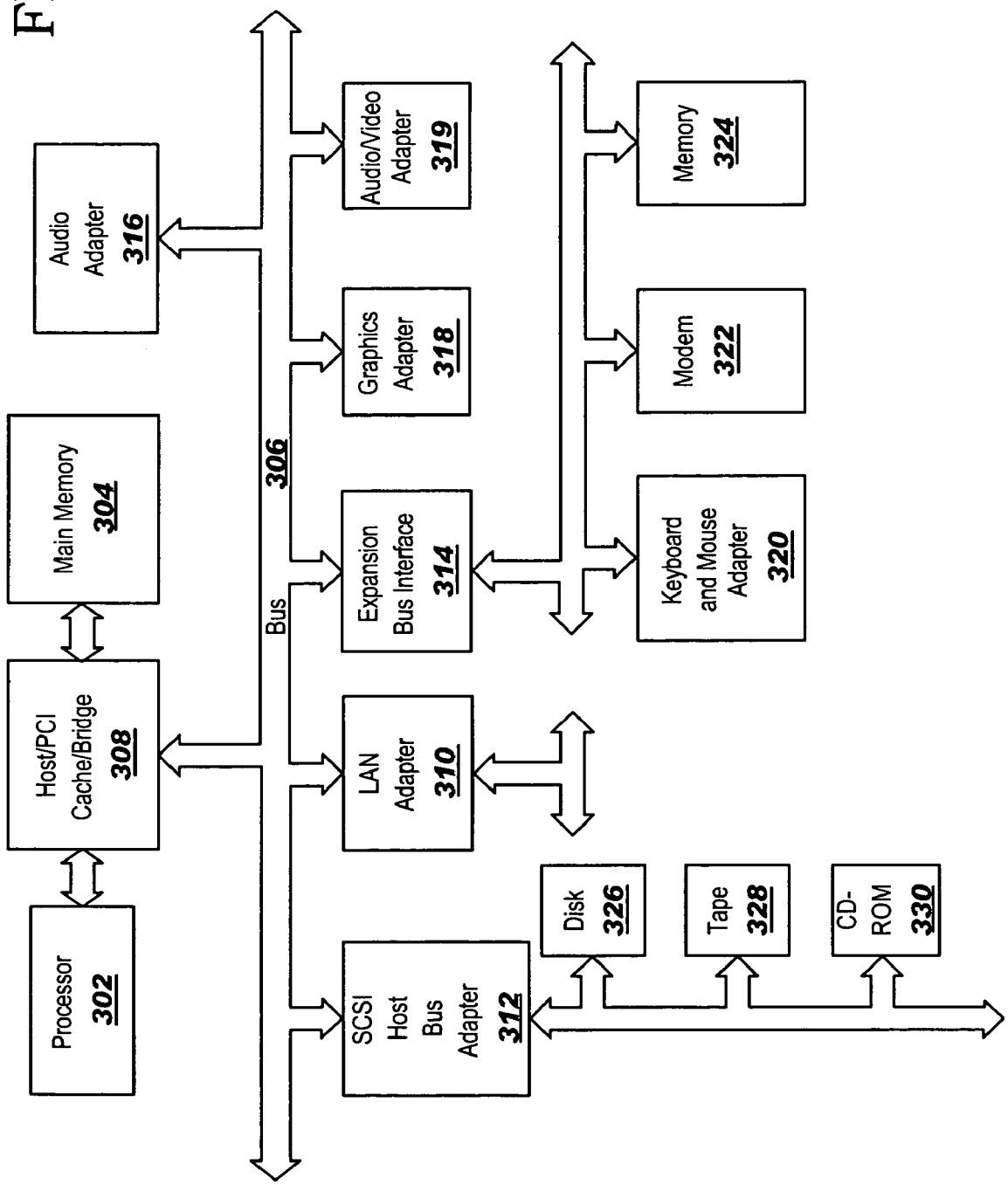
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI/cache bridge 308. PCI/cache bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as Windows XP, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent non-volatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for updating portlet windows in a portal page. In these examples, a portal page is a document containing windows or interfaces to portlets. The mechanism of the present invention uses a code, such as Javascript in the portal page to intercept a user input to a portlet window. When a user input requires updating of content in a portlet window, the request is sent to a portal server, which request the content of the specific portlet for which user interaction occurs. In response, new content is returned to replace the current content in the portlet window in which the user input occurred. The new content replaces the current content such that other portlet windows in the portal page are unchanged. In this manner, reduced server load and reduced network traffic occurred because only content for the particular portlet is required to be generated and transferred. Further, less user frustration occurs because reposition of the browser scroll position and loss of data does not occur with respect to other portlet windows.

Figure 4:
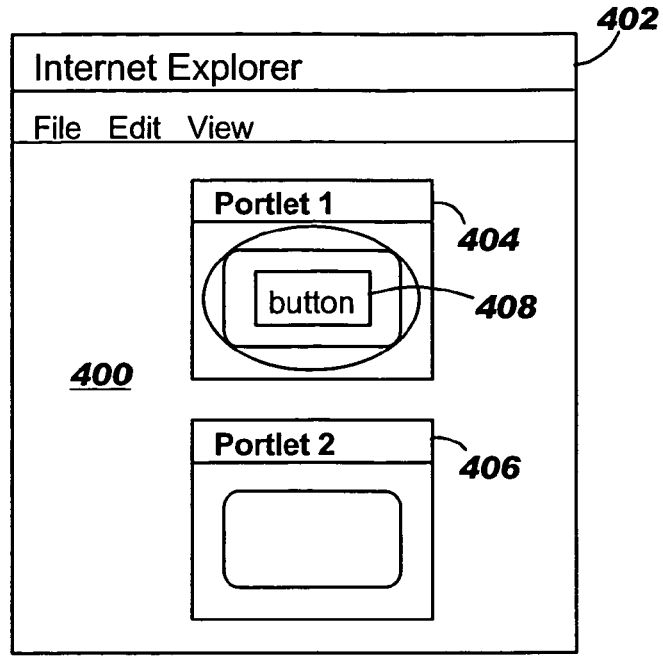
FIG. 4 is a diagram of portlet windows in a portal page in accordance with a preferred embodiment of the present invention.

Turning now to FIG. 4, a diagram of portlet windows in a portal page is depicted in accordance with a preferred embodiment of the present invention. In this example, portal page 400 is displayed within browser 402. In this example, portal page 400 contains portlet window 404 and portlet window 406. In these examples, portlet windows 404 and 406 are generated by portlets. These portlets are Java-cache based web components that process requests and generate dynamic content. Portlet window 404 may be, for example, a weather portlet window that presents information about various weather conditions. Portlet window 406 may be, for example, a financial portlet window providing stock information to a user.

Previously, without the mechanism of the present invention, a selection of button 408 in portlet window 404, causes refreshing of all of portal page 400. The mechanism of the present invention intercepts the user input selecting button 408 and sends a request only to the portlet associated with portlet window 404. A request to the portlet associated with portlet window 406 is not made unless for some reason, the selection of button 408 was designed to request new content for both of these portal windows. In this manner, server load is decreased because of the reduced amount of dynamic HTML code that has to be generated. Further, network traffic decreases because the amount of HTML code for all portlets does not have to be resent. Further, user frustrations with losing data or losing the current view are eliminated with this mechanism.

Figure 5:
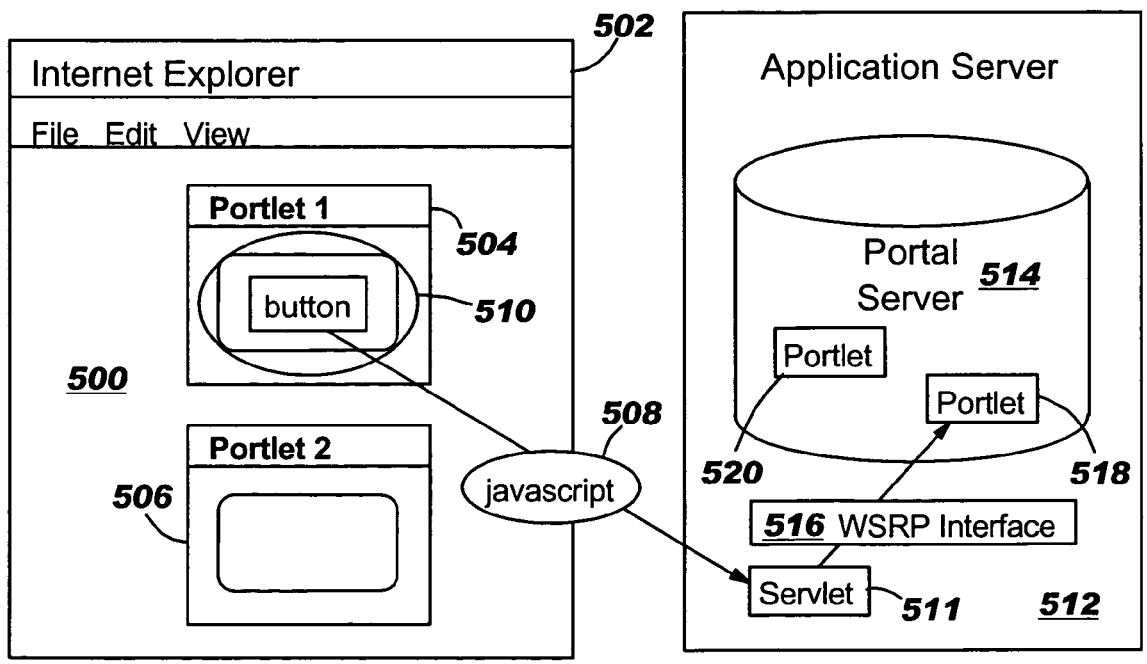
FIG. 5 is a diagram illustrating components used in updating specific regions of a portal page in accordance with a preferred embodiment of the present invention.

Turning now to FIG. 5, a diagram illustrating components used in updating specific regions of a portal page is depicted in accordance with a preferred embodiment of the present invention. In this example, portal page 500 is displayed within browser 502. Browser 502 may be executing on a client's computer system, such as data processing system 300 in FIG. 3. Portal page 500 is a Web page in these examples that contains portal windows, such as portlet window 504 and portlet window 506. Javascript 508 is used as the mechanism for updating only specific portlet windows within a portal page, such as portal page 500. When a user selects button 510, Javascript 508 intercepts this user input.

When Javascript 508 detects a user input that requires refreshing or new content for a portlet window, such as portlet window 504, Javascript 508, and servlet 511 on application server 512. In this example, application server 512 may be implemented using a data processing system, such as data processing system 200 in FIG. 2. In these examples, servlet 511 is a Java application that runs on a Web server or an application server and provides service by processing. This processing may include, for example, accessing a database at e-Commerce transactions. In this particular embodiment, the server side process involves accessing portal server 514. This access is provided through Web services for remote portlets (WSRP) interface 516. In the illustrative embodiments, WSRP is the protocol used rather than any proprietary universal resource locator encoding because this type of interface allows the application server 512 to work across multiple portal vendors and also allows a portlet, such as portlet 518 in portal server 514 to be located on a remote portal server for remote portlets. This type of interface provides a Web service interface for accessing and interacting with interactive presentation-oriented Web services. More information on this type of interface may be found in *Web Services for Remote Portlet Specification* 1.0, which is incorporated herein by reference.

Javascript 508 passes user credentials in an identifier for portlet window 504 to application server 512. Application server 512 then validates the user credentials. In response to validating the user credentials, application server 512 contacts portlet 518 to obtain new content for portlet window 504. Portlet 518 is a Java based web component that processes requests and generates dynamic content. The content generated by this portlet also is referred to as a fragment or a piece of mark-up language, such as HTML or wireless mark-up language (WML). This fragment may be aggregated with other fragments to form a complete document, such as portal page 500. More information on portlets and their use and implementation may be found in *Java Portlet Specification, Version* 1.0, which is incorporated herein by reference.

Servlet 511 returns the new content to Javascript 508 then replaces the current content displayed in portlet window 504 with the new content provided by portlet 518. This replacement may be performed by Javascript 508 using a document object model (DOM) for the browser to replace the content without interrupting other portal windows being displayed in portal page 500.

In this example, portlet window 506 is associated with portlet 520. Portlet 520 provides the content for portlet window 506. This portlet is contacted for new content only if the user input in portal page 500 requires refreshing or new content for portal window 506. In some cases, the user input may result in more than one portal window being refreshed and in other cases, all of the portal windows may be refreshed based on user input. This type of refresh may be identified by Javascript 508.

Turning next to FIG. 6, a flowchart of a process for rendering a portal page is depicted in accordance with the preferred embodiment of the present invention. The process illustrated in FIG. 6 may be implemented in a browser, such as browser 502 in FIG. 5.

The process begins by requesting a portal page from a portal server (step 600). This portal server may be, for example, portal server 514 in FIG. 5. In these examples, the portal page is a document, such as an HTML Web page that contains content generated by portlets displayed in portlet windows. Thereafter, the portal page is received (step 602). Then the portal page is rendered (step 604). The process then waits for a user input to a portlet window in the portal page (step 606). Upon detecting a user input to a portlet window, a determination is made as to whether a full-page refresh is required (step 608).

If the full-page refresh is required, the process returns to step 600. Otherwise, a Javascript listener process is initiated to process the user input (step 610) with the process then returning to step 606 as described above.

Turning next to FIG. 7, a diagram illustrating a process for processing user input to a portlet window is depicted in accordance with the preferred embodiment of the present invention. The process illustrated in FIG. 7 may be implemented in a script for a Web page, such as Javascript 508 in FIG. 5.

The process begins by detecting a user input to a portlet window (step 700). The properties of the portlet window are examined (step 702). Based upon this examination, a determination is made as to whether a refresh of a portlet window is needed (step 704).

If a refresh of the portlet window is needed, a servlet for the portlet window is contacted (step 706). Thereafter, user credentials in a portlet ID are sent to the servlet (step 708). The portlet ID is to identify the portlet associated with the portlet window requiring a refresh or new content. Thereafter, the new content for the portlet window is received (step 710). The current content in the portlet window is replaced with the new content using a document object model for the browser in this example (step 712). Next, a determination is made as to whether other portlet windows are present on the portal page that have not yet been processed (step 714). Further, if portlet windows are not present, the process terminates.

Otherwise, an unprocessed portlet window is selected (step 716). Thereafter, the process returns to step 702 as described above.

With reference again to step 704, if the portlet window does not require a refresh, the process proceeds to step 714 as described above.

This process may allow for one or more portlet windows to be refreshed with new content depending upon the particular user input. A user input may result only in the portlet window in which the user input occurred to be refreshed. In some cases, the user input may result in a different portlet window being refreshed. In other cases, one or more or all portlet windows may be refreshed based upon the user input to a particular portlet window. This determination is made by examining the different properties of the portlet window. A number of ways are present for determining which portlet window need to be refreshed independently, if any exist on the page. One mechanism involves setting a flag each portlet's HTML that indicates whether or not it supports/requires independent refresh. The Javascript can interrogate the Document Object Model (DOM) when the listener is activated to find the portlets that require a refresh. Another mechanism involves using a utility on the portal server that can be used to generate the Javascript at the time that the page's HTML is generated. This utility looks at the properties of each portlet (each portlet being represented by a java object on the portal server) and "hard code" the javascript listener with the foreknowledge of which portlets support/require independent refresh.

Thus, the present invention provides an improved method, apparatus, and computer instructions for updating specific regions of a document. The mechanism of the present invention specifically allows for updating of a portlet window being displayed in a document while leaving other portlet windows unchanged. This mechanism allows for decreasing server loads and server traffic due to the reduced amount of data that has to be generated and transferred because only requests for portlet windows needing new content are sent. As a result, only data for those particular portlet windows are generated and returned. Further, this mechanism prevents lost data due to refreshing of content entered by users but not yet sent back to portlets and portlet windows. Further, the point of interest for a user is not lost in these examples.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a client data processing system for updating a document, the method comprising:

detecting a user refresh input to a portlet window, the portlet window being one of a plurality of portlet windows on a portal page, the portlet window being generated by a portlet on a portal server;

examining a property of the portlet window, the examined property comprising a hypertext markup language (HTML) flag, wherein the HTML flag indicates a refresh property of a portlet window, wherein the examining comprises:

activating a javascript listener; and interrogating a Document Object Model (DOM) of the portlet with the javascript listener, the document object model including information about a refresh property of the portlet window;

determining, based on the examined property of the selected portlet window, whether to refresh at least one of the plurality of portlet windows;

responsive to determining to perform a refresh, requesting a portlet content from the portlet on the portal server; and refreshing a different portlet window in the plurality of portlet windows with the requested portlet content, the refreshing occurring without interrupting other portlet windows of the plurality of portlet windows.

2. The method of claim 1, further comprising:

refreshing a selected number of portlet windows of the plurality of portlet windows with the requested portlet content, the refreshing occurring without interrupting other portlet windows of the plurality of portlet windows.

3. The method of claim 1, further comprising:

determining, based on the detected user refresh input, whether an entire portal page requires a refresh.

4. The method of claim 1, further comprising:

responsive to detecting the user input to the portlet window, determining whether another portlet window in the plurality of portlet windows requires retrieval of content from a portlet on the portal server.

5. The method of claim 1, further comprising:

prior to the examining:

parsing a property of the portlet using a portal server utility on a server, the property comprising information about a refresh property; and generating a javascript listener using the portal server utility, the javascript listener including the information about the refresh property.

6. The method of claim 1, wherein requesting the portal content comprises accessing the portal server through a Web services for remote portlets (WSRP) interface.

7. The method of claim 1, wherein the document comprises an HTML Web page.

\* \* \* \* \*